United States Patent [19]
Vesely

[11] 3,936,567
[45] Feb. 3, 1976

[54] LIGHT-REFLECTIVE ADHESIVE LABEL
[75] Inventor: Edward U. Vesely, Glendale, Wis.
[73] Assignee: W. H. Brady Co., Milwaukee, Wis.
[22] Filed: Mar. 25, 1974
[21] Appl. No.: 454,588

[52] U.S. Cl. .................... 428/325; 40/2 A; 428/40;
428/41; 428/343
[51] Int. Cl.² ............................................ B32B 3/16
[58] Field of Search ........ 161/1, 5, 67, 406, DIG. 5;
350/105; 40/2 A; 428/325, 40, 41, 343

[56] References Cited
UNITED STATES PATENTS

| | | | |
|---|---|---|---|
| 2,543,800 | 3/1951 | Palmquist et al. | 350/105 |
| 3,253,971 | 5/1966 | Garling | 161/DIG. 5 |
| 3,315,387 | 4/1967 | Heuser | 40/2 A |
| 3,843,480 | 10/1974 | Dreher | 161/167 |

*Primary Examiner*—Mayer Weinblatt

[57] ABSTRACT

An adhesive label having a sandwich construction utilizing a light reflective outer layer, an inner supporting layer, and an adhesive layer as an opposite outer layer which is used to affix the label to an object.

2 Claims, 9 Drawing Figures

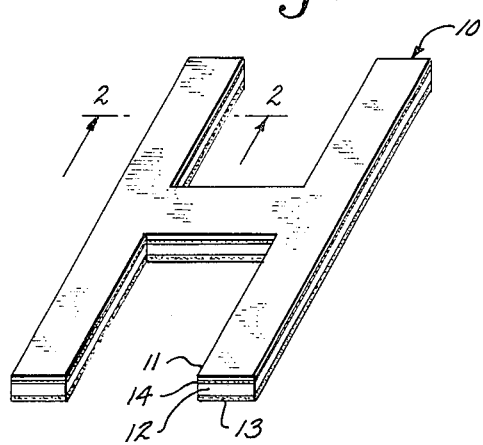
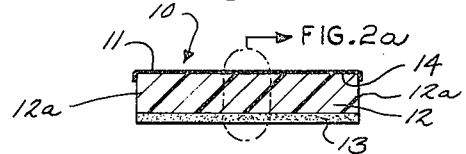
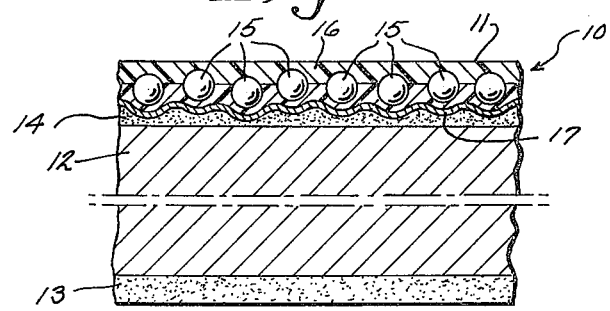
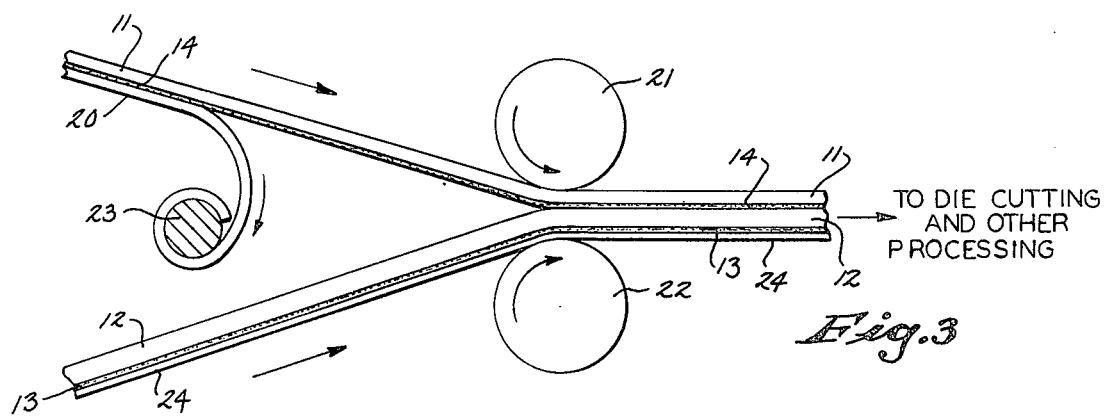
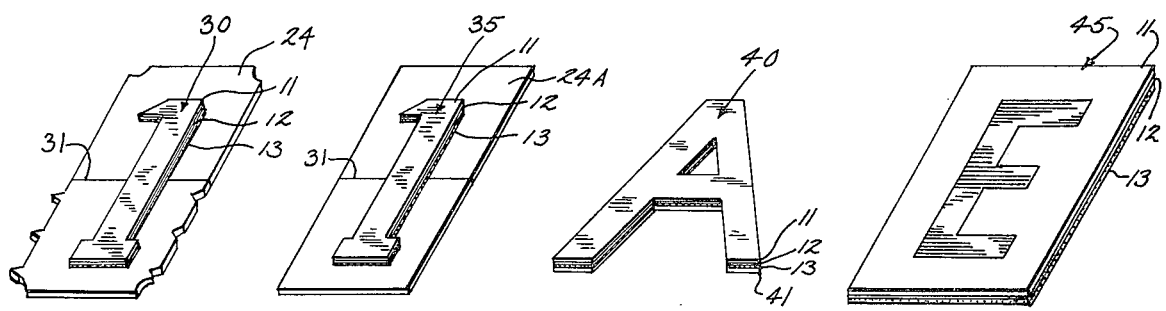
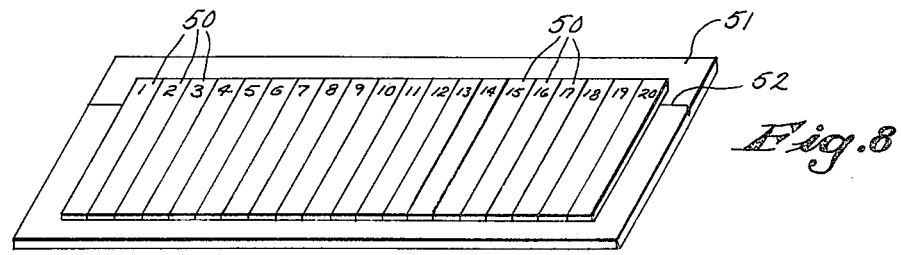

3,936,567

LIGHT-REFLECTIVE ADHESIVE LABEL

BACKGROUND OF THE INVENTION

The present invention relates to the field of adhesive labels which incorporates a light reflective outer layer.

Adhesive label constructions utilizing a light reflective layer are known which incorporate a layer of light reflective film material having adhesive on one of its surfaces that is used to attach the label to an object. This known construction has several disadvantages. Firstly, the light reflective layer must be of substantial thickness, and therefore relatively expensive, in order to be physically strong enough to withstand the forces imposed by mechanical processes such as die-cutting and other techniques employed to manufacture the label. Secondly, since the manufacture of light reflective films and sheeting is restricted to a few companies and such products are usually sold with a layer of adhesive on the film, a label manufacturer is restricted to utilizing the adhesive as supplied by a film manufacturer; in many instances, such adhesives are of restricted functionality which can limit their application. Also, because light reflective films are generally rather fragile in nature, the label manufacturer may be restricted to the use of thick or heavy light reflective films which can thereby also adversely affect the economics of the label itself.

The present invention has as one of its principal objects the provision of a label structure which can widen the range of light reflective film materials which a label manufacturer may employ. Another principal object is to provide a label structure incorporating a light reflective outer layer wherein such layer is supported to protect it during manufacturing operations which may involve cutting of the light reflective layer. Still another principal object is to provide an adhesive label construction incorporating a light reflective layer which allows the use of various types of adhesives for applying the label to an object. A more specific object is to provide the particular adhesive label structures and methods of manufacture as hereinafter claimed.

SUMMARY OF THE PRESENT INVENTION

My present invention is an adhesive label construction employing a multiple layer structure utilizing a light reflective film as the outer layer that is the visible surface of the label, an inner supporting layer adhered to the light reflective outer layer, and an adhesive layer on the opposite side of the supporting layer which is utilized to affix the label to an object. A light reflective label of this construction has a number of significant advantages which facilitate its manufacture and enhance its utility, all of which will be set forth hereinafter following the description of the preferred embodiments.

DESCRIPTION OF THE DRAWINGS

Several presently preferred embodiments of the present invention are shown in the accompanying drawings which are meant to illustrate, not limit the present invention since it is anticipated that this description will suggest changes and departures to those of ordinary skill in the art that will remain within the scope of the present invention. In the drawings:

FIG. 1 is a perspective view of an adhesive label construction of the present invention;

FIG. 2 is a sectional view taken along the plane of line 2—2 of FIG. 1;

FIG. 2A is an enlarged sectional view of a portion of FIG. 2, with a portion broken away, to more particularly illustrate structural details of the label shown in FIG. 1;

FIG. 3 is a schematic view illustrating the method for manufacturing a label according to the present invention;

FIG. 4 is a perspective view of another embodiment of a label of the present invention;

FIG. 5 is a perspective view of a third embodiment of a label according to the present invention;

FIG. 6 is a perspective view of another embodiment of a label according to this invention;

FIG. 7 is a perspective view of a fifth embodiment of a label according to this invention; and FIG. 8 is a perspective view of a sixth embodiment of a label according to the present invention.

DESCRIPTION OF PREFERRED EMBODIMENTS

FIGS. 1-2A illustrate a label 10 constructed in accordance with the present invention. Considering first FIG. 1, the label 10 is shown as comprising a light reflective outer layer 11, an inner supporting layer 12, and an adhesive layer 13. The adhesive layer 13 is used to apply the label to the object which is to be labeled. As also seen in FIG. 1, an intermediate adhesive layer 14 joins the light reflective outer layer 11 to the inner supporting layer 12. Turning next to FIG. 2, it will be noted that the light reflective layer 11 and the supporting layer 12 have superimposed edge portions, but the edges of the layer 11 are bent slightly to extend downwardly over the end portions 12a of the inner supporting layer 12. This feature, which is obtained through the use of appropriate die-cutting knives when forming the label 10, serves to protect the adhesive layer 14 against the effects of weather, etc. and thereby protects the bond between the light reflective layer 11 and the inner supporting layer 12.

FIG. 2A is a detail view showing the construction of the outer light reflective layer 11. The light reflective layer 11 is to be a film with spherical glass lens elements embedded beneath its surface and with a light-reflecting source located behind the spherical elements, resulting in a nonexposed lens, optical reflecting surface. Such films to be used for the outer reflective layer 11 produce reflex reflection (or retroflection) wherein a beam of light incident to the front of the sphere layer is refracted and reflected in such manner that a brilliant cone of light is selectively returned toward the light source even though the incident beam strikes the film at an angle. This action is unlike a mirror which causes specular reflection and unlike diffusing types of reflective surfaces which dissipate the incident light in all directions without selective return in the direction of incidence. These films are disclosed in several patents such as U.S. Pat. Nos. 2,407,680, 2,543,800 and 3,567,307. The specific layer 11 of FIG. 2A includes a plurality of small glass beads 15 embedded in a plastic binder 16 having a flat exterior surface with a reflective inner coating 17 spaced slightly behind the glass beads. This material, including a pressure sensitive adhesive layer 14, is commercially available from several manufacturers, the most widely-known being that sold by 3M under their trademark "Scotchlite." The material for the outer reflective layer 11 is purchased in film or sheet form and may range in thickness from about 4 to 10 mils., with the materials near the low end of such range being quite fragile whereas the materials at the high end of such range have greater structural integrity. The thinner materials are difficult to process by die-cutting and other mechanical operations into individual labels, but the addition thereto of the inner supporting layer 12 obviates such problems.

The inner supporting layer 12 is to comprise a layer of plastic film such as polyvinyl chloride film, polyethylene terephthalate (Mylar) film, polyethylene, nylon, polypropylene film, and similar such materials which can lend reinforcement and strengthening to the light reflective outer layer 11. In general, the inner supporting layer may be on the order of 5 to 15 mils. thick.

The adhesive layer 13 may comprise a layer of pressure sensitive adhesive, solvent activated adhesive or heat activated adhesive. In its presently most useful commercial form, the layer 13 is a pressure sensitive adhesive by which is meant that when dry it is aggressively and permanently tacky at room temperature and adheres to surfaces or objects to be labeled upon contact without the need for more than finger or hand pressure. A number of suitable formulations are known to the art and need not be described in detail except to mention that typical pressure sensitive adhesives include a rubbery polymeric material such as natural rubber, synthetic rubber, rubbery synthetic polymers and copolymers, which are usually compounded with compatible resinous tackifiers such as ester gum, terpene resins, etc., and dispersed in an appropriate solvent for application to a substrate. The adhesive layer 13 is strongly bonded to the inner supporting layer 12 so as not to delaminate therefrom when the label may be removed from a liner or storage card.

FIG. 3 illustrates a useful method for the manufacture of the label 10 as described above. The light reflective layer 11 with a pressure sensitive adhesive layer 14 bonded thereto, as generally purchased, includes a liner 20 over the adhesive 14. Such web is advanced into the nip of pressure rollers 21 and 22 but prior to reaching the nip of the roller, the liner 20 is removed to expose the adhesive layer 14, with the liner being wound up on a take-up roll 23. A web including the inner supporting layer 12 to which is bonded the adhesive layer 13, with such adhesive layer 13 being covered with a liner 24, is also lead into the nip of the rollers 21 and 22 and upon passing therethrough with the application of suitable pressure, the adhesive layer 14 on the inner side of the outer reflective layer 11 becomes firmly bonded to the exposed surface of the inner supporting layer 12. This composite web is then advanced through subsequent processing steps which may include die-cutting to cut individual labels in the desired configuration. It has been found that even very thin frangible sheets of light reflective film material can be employed as the outer layer 11 when they are first laminated to an inner supporting layer as illustrated in FIG. 3, even such materials which could not be processed without breaking and unnecessary rupturing of the die-cut labels when they were not first laminated to a supporting layer. Thus, the process as illustrated in FIG. 3 enables thin light reflective materials to be die-cut which could not ordinarily be so processed in the absence of the supporting layer.

A second embodiment of the label incorporating the foregoing structure is illustrated in FIG. 4 wherein a label 30 is mounted on a liner 24 which is split as at 31, and which has its marginal portions configured in accordance with the structure illustrated in U.S. Pat. No. 3,315,387 to provide notches and tabs for the alignment of adjacent labels. In the manufacture of the label 30, after the two webs 11 and 12 have been joined together by the pressure roller 21 and 22 as described in FIG. 3, the combined web is fed to die-cutting equipment to die-cut the label 30, and thereafter the surrounding waste is stripped away to provide a single label 30 carried on a backing 24 comprising the liner die-cut in the specified form.

FIG. 5 illustrates a third embodiment incorporating a label 35 of the structure previously described which is carried on a liner 24A similar to that of the preceding embodiment but having its marginal portions cut in a straight or rectilinear configuration.

FIG. 6 illustrates a label 40 which includes a light reflective outer layer 11 previously described joined to the inner supporting layer 12, having a pressure sensitive adhesive layer 13 on its opposite surface, and further including a liner 41 which is die-cut to the specific shape of the label 40 so as to cover the adhesive layer 13 during storage of the label. When the label 40 is to be applied to an object, the liner 41 is removed to expose the adhesive 13 which is then used to join the label to an object.

FIG. 7 shows still another embodiment of the present invention comprising a label 45 of a generally rectangular shape (although other shapes may be employed) and incorporating the light reflective layer 11 joined to an inner supporting layer 12 with adhesive 13 on the opposite surface of the supporting layer. In this instance, the label 45 is die-cut into a specified shape such as the rectangle, and the specific indicia, i.e. the E in FIG. 7 is printed over a portion of the light reflective layer 11. The printing may be in black or other suitable colors. Thus, the area surrounding the printed indicia is light reflective and provides the desired reflective characteristics.

FIG. 8 illustrates another embodiment in which the label structure of the present invention may be incorporated, this time in the form generally referred to as a wire-marker comprising a thin strip-like label which may be printed with a letter, numeral or other identifying indicia and then wrapped about a wire or similar article. The specific construction shows a plurality of labels 50 each having the multiple layer structure as illustrated in FIG. 1 carried on a backing card 51 which has a line of weakness at 52 in order to enable the strip portion to be separated from the balance of the card to expose an end portion of each label for removal from the card. This construction enables the use of light reflective marker labels for use in identification of wires and other thin similar conduits.

The labels illustrated in FIGS. 4-8 are carried on a backing or a liner. If the adhesive layer 13 is a pressure sensitive adhesive, the liner or backing is to be "releasably" joined to the adhesive, which term is used to denote that the adhesive layer has a low degree of adhesion to the backing or liner so that the label can be removed therefrom without any undue delamination of the adhesive from the layer 12 onto the backing or liner. To accomplish this, the liner or backing may be a material which is coated or otherwise treated so as to provide a release coating for the particular adhesive used with the label to be stored thereon.

EXAMPLE

As a specific illustration of the adhesive label structure described above, labels according to the embodiment of FIG. 4 were manufactured utilizing a light reflective layer of "Scotchlite" promotional grade material that was approximately 4 mils. thick. The reflective layer had a coating of pressure sensitive adhesive on its surface that was firmly laminated to an inner supporting layer comprising a 10 mil. thick layer film of polyvinyl chloride. The opposite surface of the vinyl film was coated with pressure sensitive adhesive that was approximately 5 mils. thick. The two webs, after being laminated together in the composite as illustrated above in FIG. 3, were subjected to various die-cutting operations in order to form individual labels carried on individual backings 24. It was noted during such manufacturing processes that the labels could be die-cut without rupturing or tearing of the thin light reflective layer 11; thus, there was no damage at the corners or cut-out portions of the various letters and numerals. In contrast, it was not possible to form labels of the type illustrated in FIG. 4 utilizing the same thin reflective film as the light reflective layer 11 itself in the absence of the inner supporting layer 12.

The composite sandwich structure disclosed above for a light reflective label exhibits a number of useful advantages in the label field.

Firstly, die-cutting and other operations which employ severing of a thin light reflective film can be accomplished without damaging the film, provided that it is first laminated to an inner supporting layer as described above. This permits the use of very thin and fragile light reflective layers in label constructions whereas formerly the label manufacturer was confined to the use of the thicker more expensive grades of such light reflective sheeting.

Secondly, the labels of the present construction can be removed easily from a backing or liner without damaging the label itself. On the other hand, labels made from very thin light reflective films have a tendency to break when removed from the liner because they seem to be quite fragile or brittle, particularly in the lighter weight or thinner materials. It was further noticed that the added strength characteristic of the labels of this invention reduced damage to the labels themselves in the event that they were originally misapplied to an object, i.e. if incorrectly placed the first time, they could be removed and applied in the correct position without breaking the label.

Thirdly, it was noticed that when labels as described hereinabove were applied to a rough surface, the surface imperfections of the object being labeled would not cause corresponding imperfections in the outer light reflective layer of the label itself. This provides a label of improved appearance and also enhances its light reflective ability since a relatively smooth and flat exterior surface is maintained. This also allows the labels to be adapted for application to a wider variety of objects. Thus, a very thin label may be suitable for a very smooth surface, but have an undesirably rough appearance when applied to a rough surface. However, this defect is eliminated by the thicker label construction of this invention since it can be applied to both smooth and rough surfaces without causing imperfections in the light-reflective outer layer.

Fourthly, the label manufacturer is now able to select the adhesive layer 13 from a wide range of compositions instead of being limited to employment of the particular adhesive applied by the manufacturer of the light reflective sheeting on its one surface. This enables the label manufacturer to tailor the adhesive layer to the specific end use for the label, such as employing a particularly tenacious adhesive or using a solvent or heat activated adhesive if the end use should so require.

Lastly, as illustrated in FIG. 2, the light reflective layer may slightly overlap the ends of the inner supporting layer and cover the adhesive 14 which bonds the light reflective layer to the supporting layer. This provides protection for such adhesive, such as when the label may be exposed to outdoor conditions and thereby inhibit delamination of the light reflective layer from the supporting layer.

There has thus been described a label structure incorporating an outer light reflective layer which is capable of extending the usefulness and applicability of such light reflective materials in adhesive labels by improving its processibility and providing advantageous features in the finished label itself. According to the method herein disclosed, the light reflective material is first laminated to a supporting layer before undergoing processing techniques which involve cutting of the light reflective layer. A label manufacturer thus has the capability of employing light reflective materials in label constructions without being forced to utilize the thicker or more expensive materials commercially available by now being able to suitably manufacture labels from thin, flimsy light reflective sheets.

I claim:

1. A composite light-reflective adhesive label construction comprising, in combination:
    1. a first film having
        a. an outer layer of light reflective film consisting of small sphere lenses embedded in a transparent binder and a light reflective coating behind the sphere lenses to provide reflex reflection of incident light; and
        b. a pressure sensitive adhesive layer;
    2. a second plastic film adhered to the pressure sensitive adhesive of the first film to form a supporting layer for the first film, the first and second films being joined together prior to manufacture of the label; and
    3. a layer of adhesive applied to the second film on a surface thereof opposite from the first film and which is used to affix the label to an object.

2. A light-reflective label according to claim 1 wherein:
    the first film includes edge portions which are superimposed with edge portions of the second film and which extend downwardly along end portions of the second film.

* * * * *